United States Patent
Suh et al.

(10) Patent No.: US 10,945,219 B2
(45) Date of Patent: Mar. 9, 2021

(54) SYSTEM AND METHOD FOR A WIRELESS NETWORK HAVING MULTIPLE STATION CLASSES

(71) Applicants: Jung Hoon Suh, Kanata (CA); Osama Aboul-Magd, Kanata (CA); Kwok Shum Au, Ottawa (CA)

(72) Inventors: Jung Hoon Suh, Kanata (CA); Osama Aboul-Magd, Kanata (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 15/358,293

(22) Filed: Nov. 22, 2016

(65) Prior Publication Data

US 2017/0303208 A1 Oct. 19, 2017

Related U.S. Application Data (60) Provisional application No. 62/323,010, filed on Apr. 15, 2016.

(51) Int. Cl.
| | |
|---|---|
| H04W 52/24 | (2009.01) |
| H04W 52/34 | (2009.01) |
| H04L 27/26 | (2006.01) |
| H04W 72/04 | (2009.01) |
| H04W 4/38 | (2018.01) |
| H04L 29/08 | (2006.01) |

(Continued)

(52) U.S. Cl.
CPC ....... *H04W 52/248* (2013.01); *H04L 27/2601* (2013.01); *H04W 52/346* (2013.01); *H04W 72/0453* (2013.01); *H04L 67/12* (2013.01); *H04W 4/38* (2018.02); *H04W 84/12* (2013.01); *H04W 88/10* (2013.01)

(58) Field of Classification Search
CPC .. H04L 27/2601; H04L 67/12; H04W 52/248; H04W 72/0453; H04W 4/38; H04W 84/12; H04W 88/10
See application file for complete search history.

(56) References Cited

U.S. PATENT DOCUMENTS

| | | | |
|---|---|---|---|
| 2004/0136344 A1* | 7/2004 | Kim ...................... | H04B 7/2628 370/335 |
| 2004/0141525 A1* | 7/2004 | Bhushan ............... | H04L 1/1671 370/473 |

(Continued)

FOREIGN PATENT DOCUMENTS

| | | |
|---|---|---|
| CN | 102356690 A | 2/2012 |
| CN | 102792628 A | 11/2012 |

(Continued)

OTHER PUBLICATIONS

International Search Report dated May 10, 2017 for International Patent Application No. PCT/CN2017/076819 filed Mar. 15, 2017.

(Continued)

*Primary Examiner* — Peter P Chau (57) ABSTRACT

Methods and protocols are discussed to address IoT coexistence with existing WLAN devices and protocols. Some embodiments allow for the IoT devices to be located further from the Access Point than other devices, and provide higher power solutions to serve these long range devices. New IoT Frame structures are disclosed to allow for the above.

16 Claims, 9 Drawing Sheets

(51) Int. Cl.
    *H04W 84/12*        (2009.01)
    *H04W 88/10*        (2009.01)

(56)           References Cited

U.S. PATENT DOCUMENTS

| 2004/0184567 | A1* | 9/2004  | McDonough | H04B 7/2643 |
|              |     |         |           | 375/340     |
| 2005/0058154 | A1* | 3/2005  | Lee       | H04L 1/0066 |
|              |     |         |           | 370/473     |
| 2012/0028671 | A1  | 2/2012  | Niu et al. |            |
| 2012/0281611 | A1* | 11/2012 | Zhang     | H04W 52/52  |
|              |     |         |           | 370/312     |
| 2013/0208607 | A1* | 8/2013  | Abraham   | H04W 74/0816|
|              |     |         |           | 370/252     |
| 2014/0247824 | A1  | 9/2014  | Sohn et al. |           |
| 2016/0006842 | A1* | 1/2016  | Tahir     | H04L 69/03  |
|              |     |         |           | 370/470     |
| 2016/0249342 | A1  | 8/2016  | Hart      |             |
| 2016/0309478 | A1* | 10/2016 | Nabetani  | H04B 7/0697 |
| 2017/0111875 | A1* | 4/2017  | Azizi     | H04W 56/001 |
| 2017/0311291 | A1  | 10/2017 | Dai et al. |            |

FOREIGN PATENT DOCUMENTS

| CN | 105472744  | A  | 4/2016 |
| EP | 2154792    | A1 | 2/2010 |
| GB | 2543698    | A  | 4/2017 |
| WO | 2010095802 | A1 | 8/2010 |
| WO | 2015069908 | A1 | 5/2015 |
| WO | 2015103610 | A2 | 7/2015 |
| WO | 2016028124 | A1 | 2/2016 |
| WO | 2016032258 | A2 | 3/2016 |

OTHER PUBLICATIONS

Stacey, Robert, "IEEE P802.11 Wireless LANs Specification Framework for TGax", IEEE 802.11-15/0132r15, Mar. 17, 2017.
Abdoli, J et al., "Filtered OFDM: A New Waveform for Future Wireless Systems", IEEE 16th International Workshop on Signal Processing Advances in Wireless Communications (SPAWC), Jul. 1, 2015.

* cited by examiner

SYSTEM AND METHOD FOR A WIRELESS NETWORK HAVING MULTIPLE STATION CLASSES

CROSS REFERENCE TO RELATED APPLICATIONS

This application claims the benefit of priority to U.S. Patent Application Ser. No. 62/323,010 entitled "System and Method for a Wireless Network Having Multiple Station Classes" filed Apr. 4, 2016, which is hereby incorporated by reference in its entirety.

TECHNICAL FIELD

This invention relates to wireless transmission systems and methods.

BACKGROUND

Institute of Electrical and Electronics Engineers (IEEE) standards publication 802.11 outlines protocols for implementing wireless local area networks (WLAN), and sets forth a physical (PHY) layer frame format that includes a preamble portion carrying control information and a payload portion carrying data. The preamble portion may include a variety of preamble fields, including a legacy short training field (LSTF), a legacy long training field (LLTF), and a legacy signal (LSIG) field. IEEE standards publication 802.11 includes various extensions, for example 802.11ax, a copy of the draft standard for IEEE P802.11ax™/D0.1, March 2016. There is a need for systems and frame formats to be backward compatible with legacy nodes which follow older versions of the standards, while providing advanced features for other devices. There is also a need to accommodate different types of devices.

One type of device is user equipment (UE) which includes phones and other devices utilized by human users. Another type of device includes IoT (Internet of Things) devices, which in some applications will have longer range requirements than UE. Accordingly IoT devices can also be called long range devices, which may have longer range requirements than other stations (STAs) such as UEs.

SUMMARY

Aspects of this disclosure may address IoT coexistence with existing WLAN devices and protocols. Some embodiments may allow for the IoT devices to be located further from the Access Point than other devices, and provide higher power solutions to serve these long range devices. New IoT Frame structures are disclosed which may allow for the above.

An aspect of the disclosure provides a method for wireless communications including an access point (AP) scheduling IoT transmissions to IoT devices in a frame which includes data directed to non IoT devices. In some embodiments, the IoT transmissions are sent at a higher power than the data directed to non IoT devices. In some embodiments the method includes concentrating the AP transmission power in a narrow subcarrier in order for the AP signal to reach a far STA (station, which can be an IoT device). Some embodiments allow for power saving modes for IoT devices.

An aspect of the disclosure provides a method for wireless communications by an access point (AP). Such a method includes receiving a first data packet to be transmitted to a station of a first class with a long range requirement. Such a method further includes inserting the first data packet into a frame for transmission, the frame including bits intended for stations of a second class without the long range requirement. The method further includes transmitting the frame with the portion of the frame including the first data packet being transmitted at a higher power than the remainder of the frame. In some embodiments the bits included for stations of a second class include header bits. In some embodiments the header bits include legacy preamble bits, and the AP concentrates power for the payload portion of the frame into a plurality of narrowband subcarriers based on the power required to satisfy the long range requirement. In some embodiments the method can also include receiving at least one additional data packet to be transmitted to at least one station of a second class without the long range requirement. In such a case inserting includes inserting the payload data from the at least one additional data packet into another portion of the frame. In some embodiments the method further includes receiving a second data packet to be transmitted to a station of a first class inserting the second data packet into the frame for transmission. In such embodiments transmitting includes transmitting the frame with the portion of the frame including the first data packet and the second data packet being transmitted at a higher power than the remainder of the frame. In some embodiments the first data packet and the second data packet are inserted into pre-defined sub channel portions of the frame. In some embodiments the pre-defined sub channel portions of the frame include the center 26 Resource Units of the frame. In some embodiments the frame includes a DC portion which separates the first data packet and the second data packet.

Another aspect of the disclosure provides an access point (AP). Such an AP includes an input/output interface configured to receive a first data packet to be transmitted to a station of a first class with a long range requirement. The AP also includes a framer configured to insert the first data packet into a frame for transmission, the frame including bits intended for stations of a second class without the long range requirement. The AP also includes a radio unit configured to transmit the frame with the portion of the frame including the first data packet being transmitted at a higher power than the remainder of the frame. In some embodiments the bits included for stations of a second class include header bits. In some embodiments the header bits include legacy preamble bits, and the radio unit concentrates power for the payload portion of the frame into a plurality of narrowband subcarriers based on the power required to satisfy the long range requirement. In some embodiments the radio unit comprises a plurality of filters for filtering frequency components and a combiner for producing a signal with the frame having the portion of the frame including the first data packet being transmitted at a higher power than the remainder of the frame. In some embodiments the I/O interface receives at least one additional data packet to be transmitted to at least one station of a second class without the long range requirement. In such embodiments the framer is configured to include payload data from the at least one additional data packet into the frame and the radio unit is configured to transmit the frame with the portion of the frame including the at least one additional data packet being transmitted at a lower power than the portion of the frame including the first data packet. In some embodiments the I/O interface receives a second data packet to be transmitted to a station of a first class and the framer is configured to insert the second data packet into the frame for transmission. In such embodiments the radio unit is configured to transmit the frame with the portion of the frame including the first data packet and the second data packet being transmitted at a higher power than the remainder of the frame. In some embodiments the framer is configured to insert the first data packet and the second data packet into pre-defined sub channel portions of the frame. In some embodiments the pre-defined sub channel portions of the frame include the center 26 Resource Units of the frame. In some embodiments the framer is configured to include a DC portion which separates the first data packet and the second data packet.

Another aspect of the disclosure provides an access point (AP). Such an AP includes an input/output interface configured to receive a first data packet to be transmitted to a station of a first class with a long range requirement, a radio portion for transmitting frames, a processor and a memory. The memory includes machine readable instructions which when executed by the processor cause the AP to insert the first data packet into a frame for transmission, the frame including bits intended for stations of a second class without the long range requirement and to transmit the frame with the portion of the frame including the first data packet being transmitted at a higher power than the remainder of the frame. In some embodiments the bits included for stations of a second class include header bits. In some embodiments the header bits include legacy preamble bits, and machine readable instructions cause the radio unit to concentrate power for the payload portion of the frame into a plurality of narrowband subcarriers based on the power required to satisfy the long range requirement.

Another aspect of the disclosure provides a method for downlink wireless communications by an access point (AP). Such a method includes transmitting a legacy preamble portion, and transmitting an OFDMA portion comprising at least one subcarrier RU, and at least one IoT payload, wherein the IoT payload is transmitted with a higher power than data associated with the subcarrier RU.

The foregoing and other objects, features, aspects and advantages of the present invention will become more apparent from the following detailed description, taken in conjunction with the accompanying drawings, of exemplary embodiments of the invention, which description is by way of example only.

DESCRIPTION OF EXEMPLARY EMBODIMENTS

The structure, manufacture and use of exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

As stated, there are currently a variety of extensions to 802.11 WLAN systems, with more extensions being developed. One such extension is 802.11ax. Examples in this disclosure will be discussed with reference to a high efficiency (HE) 802.11ax frame format, but it should be appreciated that the systems and methods discussed herein are not limited to 802.11ax.

802.11ax systems have a contention procedure for determining when particular access points (APs) and devices can transmit. Accordingly, 802.11ax has a transmission opportunity (TXOP) which is limited in time. Accordingly, frame lengths are limited in such a network. Accordingly, IoT frame lengths of 60 bytes of data are discussed herein as examples, as it is assumed that approximately 60 bytes of data is required for a typical sensor frame. However this is just an example and the actual data size for an IoT frame may be different. Frames are not limited to 60 byte-length data frames, but are limited by some system requirements, such as the TXOP in systems which use them.

The overall frame size is determined by the size of the data (e.g., payload) portion and the PHY header portion (also referred to as the preamble). Accordingly the IoT frame can be larger than 60 bytes for frames which include a 60 byte payload.

Figure 1:
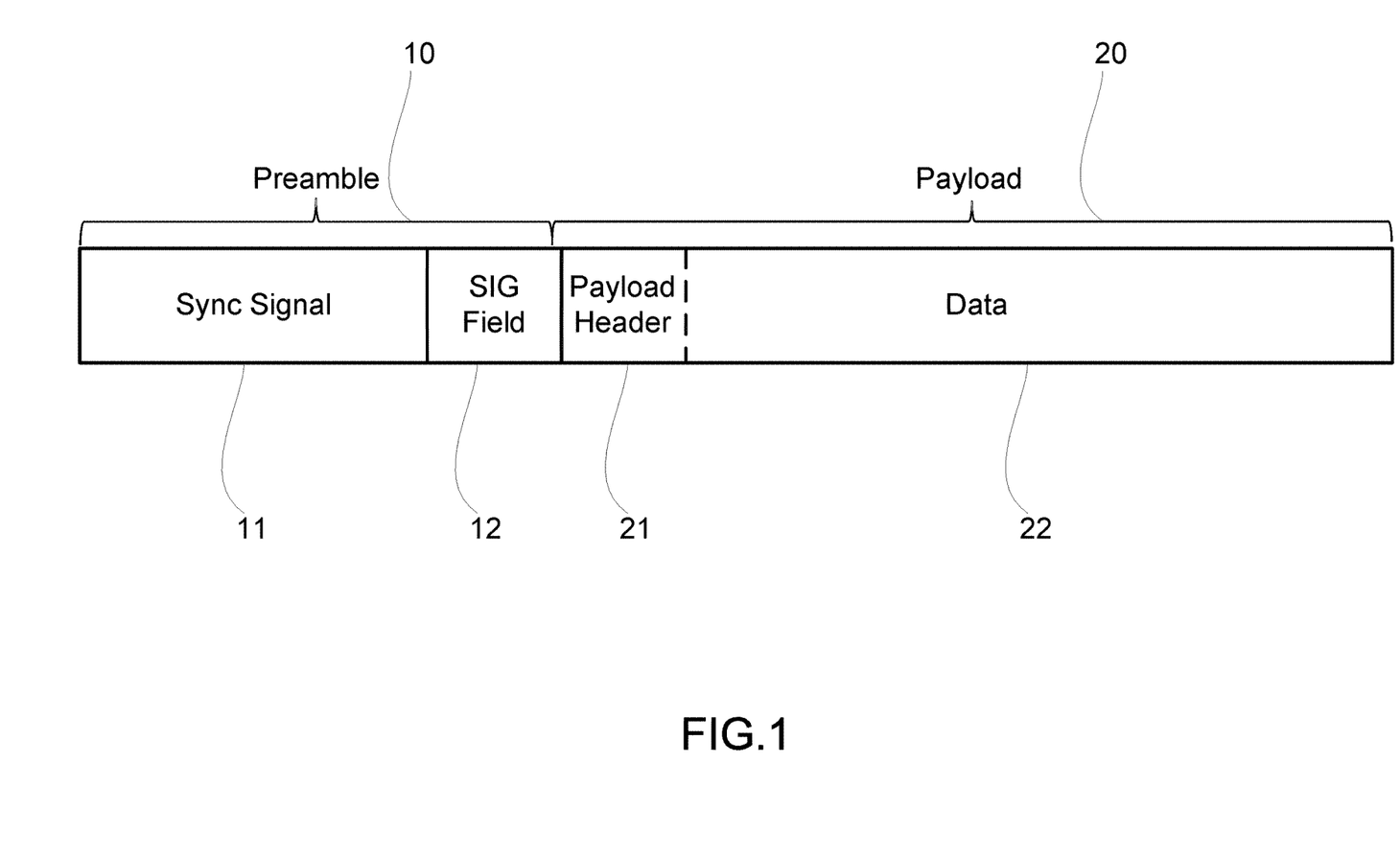
FIG. 1 illustrates a generalized IOT frame format, according to an embodiment.

FIG. 1 illustrates a generalized frame format, according to an embodiment, which can be useful for an IoT frame. The frame includes a preamble 10 and a payload 20. The preamble includes a Sync Signal 11 and a SIG field 12. The payload 20 includes a payload header 21 and data 22. The Sync Signal 11 is a reference signal used for synchronization and channel estimation. The SIG Field 12 carries the control signaling for the IoT frame. The IoT data 22 will be transmitted in the Payload portion 20. The length of the frame depends on such factors as the Orthogonal Frequency Division Multiplexing (OFDM) symbol length, typically denoted in units milliseconds (msec), bandwidth (BW), and Fast Fourier Transform (FFT) size.

The OFDM symbol length (in msec) depends on the bandwidth (BW) and FFT size as follows:
BW, 1 kHz
    16-FFT: 16 msec, 64-FFT: 64 msec
BW, 5 kHz
    16-FFT: 3.2 msec,
    64-FFT: 12.8 msec,
    256-FFT: 51.2 msec
BW, 100 kHz
    16-FFT: 0.16 msec,
    64-FFT: 0.64 msec,
    256-FFT: 2.6 msec
BW, 200 kHz
    16-FFT: 80 usec,
    32-FFT: 0.16 msec,
    64-FFT: 0.32 msec,
    256-FFT: 1.3 msec An example frame includes between 64~128 sequences for the Sync Signal, which uses approximately 1~2 symbols (0.32~0.64 msec) using 64-FFT for 200 kHz. The SIG Field uses approximately 32 bits of information, which uses approximately 1 symbol (0.32 msec) based on 64-FFT with 200 kHz BW. The Payload will be about 60 bytes long and thus uses approximately 7~8 symbols (2.24~2.56 msec) with QPSK and code rate ½, based on 64-FFT for 200 kHz BW.

Accordingly, 3.5 msec is used for one IoT Physical Protocol Data Unit (PPDU) length which is within the 802.11 TXOP, if we assume 200 kHz for the BW of IoT frame, and 64-FFT per OFDM symbol. This assumes QPSK modulation. Other modulation techniques can be used. For example, BPSK modulation. Further, it is noted the bandwidth (BW) is not limited to 20 MHz, and other BW PPDUs and FFT sizes can be used.

Figure 2:
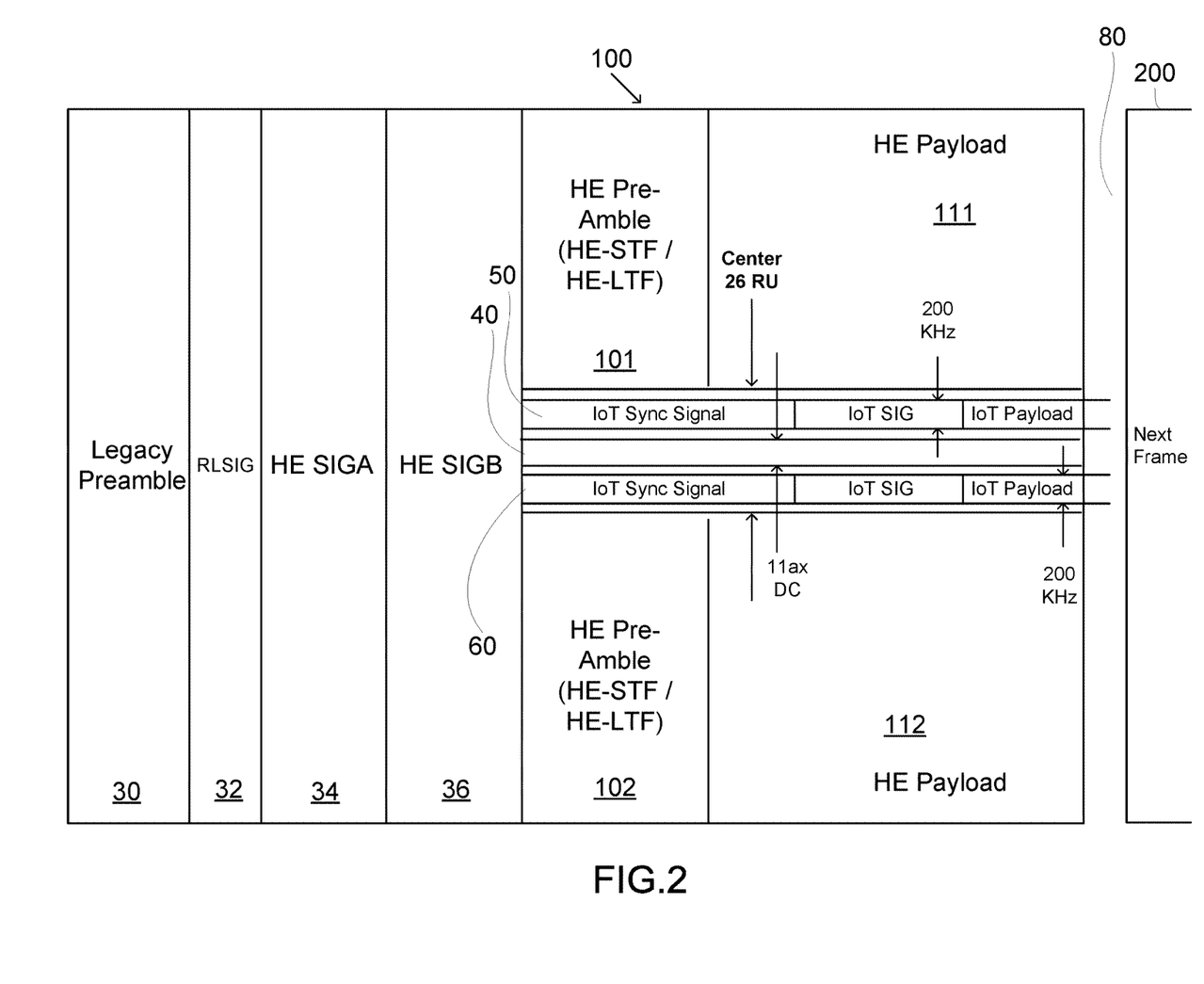
FIG. 2 illustrates an 20 MHz 802.11ax MU PPDU frame format with the IoT frame inserted in the center 26 tone RU according to an embodiment.

Downlink (DL) transmission from an AP to wireless devices, hereafter stations (STA), will now be discussed using an example 20 MHz 802.11ax Multi-user (MU) PPDU frame format which is illustrated in FIG. 2, according to an embodiment. However, it is noted the bandwidth (BW) is not limited to 20 MHz, and other BW PPDUs and FFT sizes can be used.

In the embodiment illustrated in FIG. 2, the 20 MHz 802.11ax MU PPDU includes a legacy preamble field 30, an RLSIG field 32, an HE SIGA field 34, and HE SIGB field 36. The PPDU also includes an OFDMA portion including a pair of HE preamble fields 101 and 102 and a pair of HE Payload fields 111, 112, separated by a center 26 subcarrier sized resource unit (RU) region containing a DC component 40. In the illustrated example, two IoT frames 50, 60 are inserted in the center 26 subcarrier RU. It should be appreciated that an 802.11 frame can include additional fields which are not shown. It should be appreciated that the generalized frame format illustrated in FIG. 2 is generalized as it does not include specific timing or symbol information. Further, the "fields" of this figure can comprise one or more fields depending on the embodiment. The fields of HE Payload fields 111, 112, in particular may be subdivided into a number of subcarrier RU's.

In other embodiments the number of IoT frames to be inserted is not limited to two but may be any integer number, and the position of the 26 subcarrier RU which includes the IoT frames is not limited to the center 26 subcarrier RU. It should be appreciated that if the IoT frames are inserted into another subcarrier RU, they are not separated by the DC component 40, which remains in the center 26 subcarrier RU. However, these parameters, including but not limited to the position of subcarrier RUs to be inserted and the number of IoT frames to be inserted, should be specified, so the IoT devices can detect the DL IoT frames without decoding any control signaling.

In some embodiments the IoT frame may not be perfectly synchronous from the IEEE 802.11ax PPDU. In some embodiments the length of the IoT frame is not limited by the IEEE 802.11ax PPDU length, and can be shorter or longer than the IEEE 802.11ax PPDU length. This is illustrated in FIG. 2, with the IoT frames extending beyond the border of the IEEE 802.11ax PPDU frame. Accordingly the IoT frame can extend into the short interframe spacing (SIFS) which exists between the IEEE 802.11ax PPDUs. This can be seen in FIG. 2, in which the two IoT frames 50, 60 extend into the SIFS 80 which separates frame 100 from the next frame 200. However, the IoT frames should not extend into any subsequent frame or beyond the TXOP. Further, IEEE 802.11ax contention is required after the TXOP is over in order to transmit any subsequent IoT frames.

Figure 3:
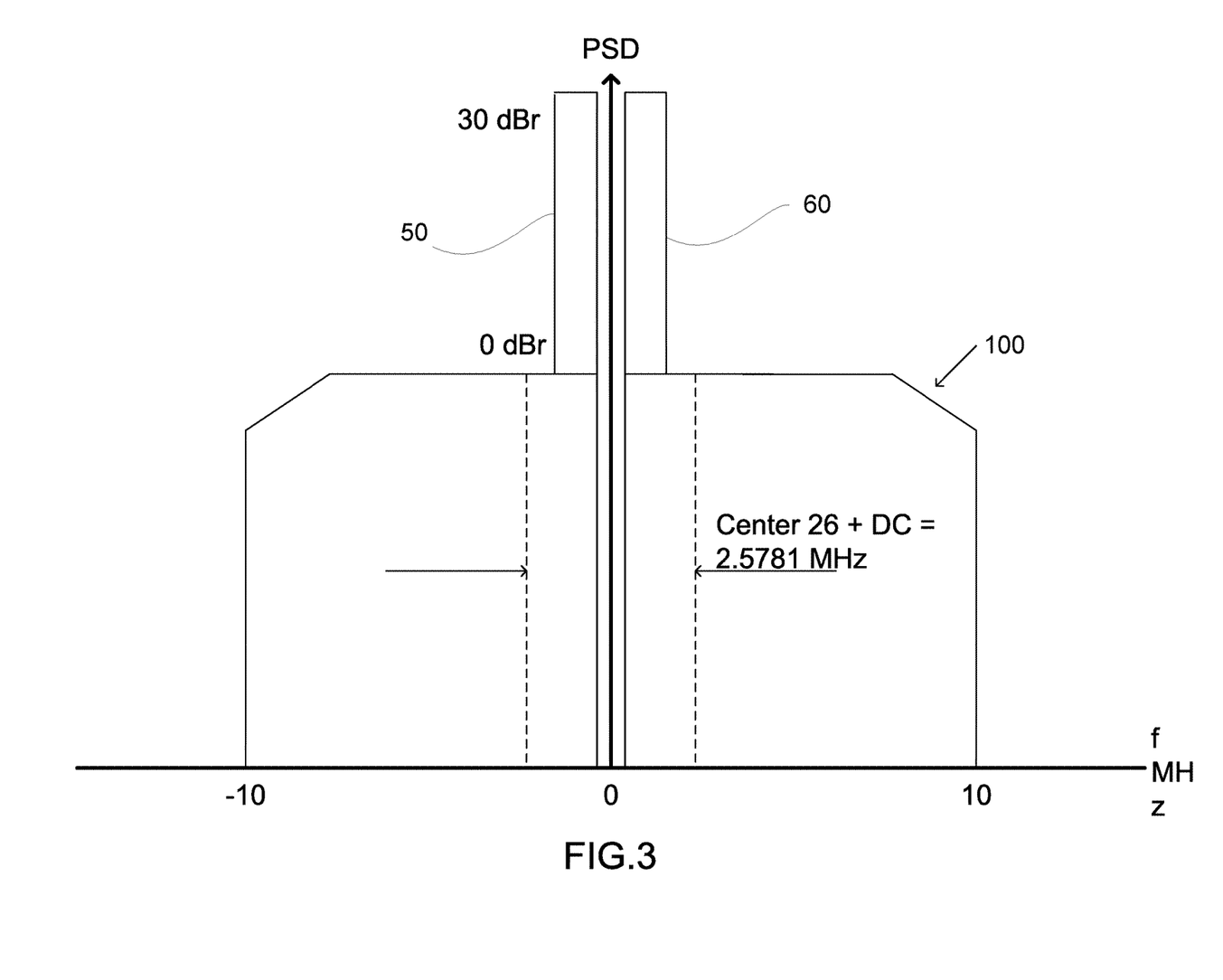
FIG. 3 illustrates the power difference between the IOT frame according to an embodiment.

In order to achieve longer range for the IoT frames, the IoT frames are inserted into the IEEE 802.11ax PPDU such that each IoT frames are higher in power spectral density (PSD) than the remaining IEEE 802.11ax PPDU. This increased PSD allows for longer distance transmissions and facilitates recovery of the IoT frame. The IoT frame having a higher PSD enables the IoT devices to detect the IoT frame only, ignoring the rest of the IEEE 802.11ax PPDU as back-ground noise. In some embodiments the IoT frame has a PSD which is 30 dB higher than that of the IEEE 802.11ax PPDU. This is illustrated in FIG. 3, in which IoT frames 50, 60 are shown to have a PSD of 30 dBr higher than the rest of frame 100 (which has a reference level of 0 dBr). In FIG. 3, the horizontal axis is frequency and the vertical axis is PSD. It should be noted that the figures are not to scale. For example, in FIG. 3 the center 26 subcarrier RU+DC occupies 2.5781 MHz of frequency, but the IoT frames each occupy 0.2 MHz (200 Khz), and the DC component 40 is exaggerated to illustrate it represents a null space in terms of power.

In the following example, 802.11ax device refers to 802.11ax devices which are not IoT devices. In the example illustrated in FIG. 2 the AP doesn't schedule transmissions to 802.11ax devices in the center 26 subcarrier RU when IoT frames are scheduled. However, in some embodiments, the center 26 subcarrier RU can be used for 802.11ax devices when no IoT transmission is needed (which in some examples may be the majority of the time). In such embodiments, the center 26 subcarrier RU is only reserved when IoT transmissions are needed. The IoT frames are inserted at those times. Such an embodiment can improve bandwidth efficiency, by allowing the center 26 subcarrier RU to be used when no IoT transmissions are needed, but adds additional complexity in terms of scheduling.

Figure 4:
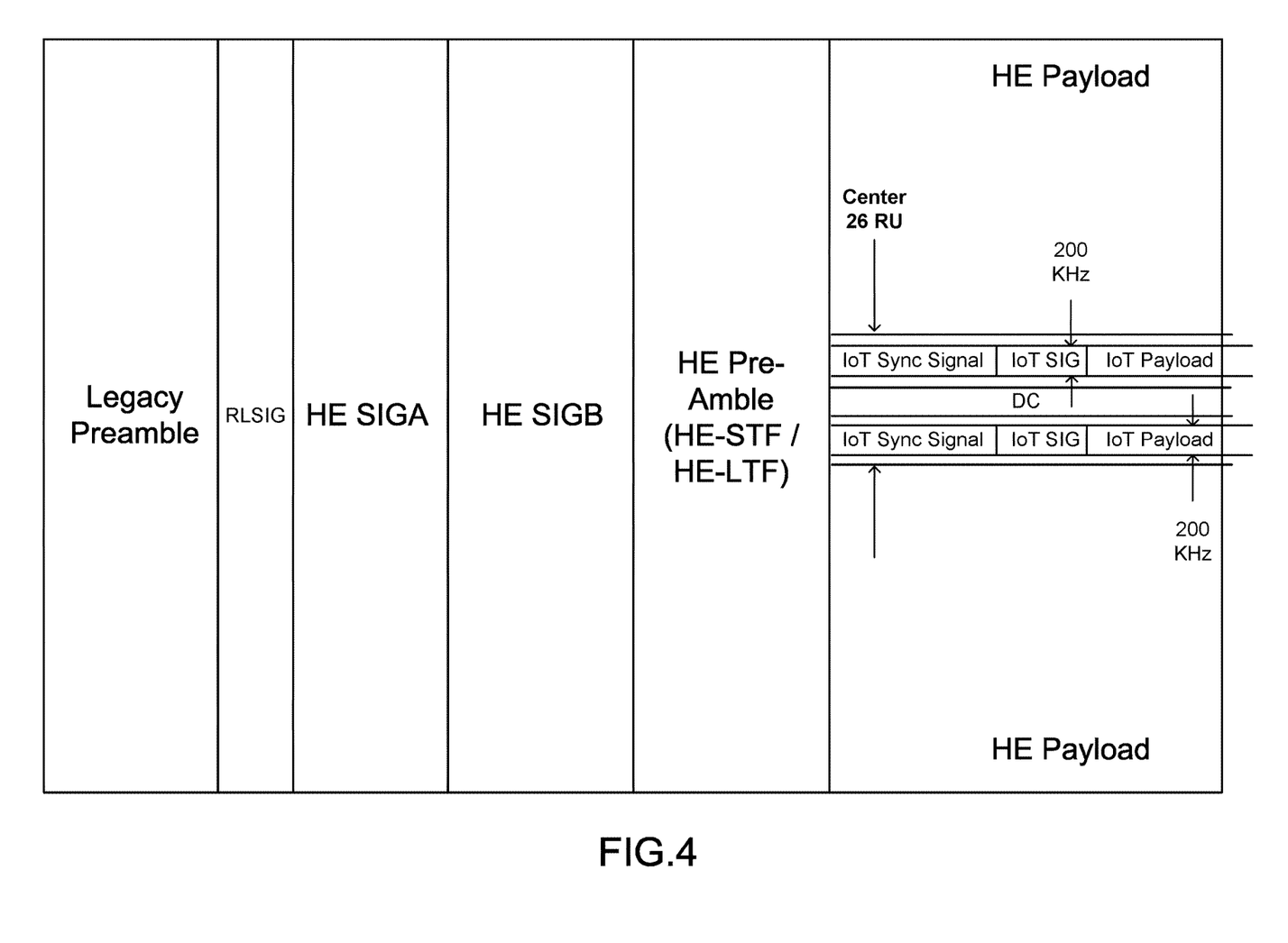
FIG. 4 illustrates a variation of the frame of FIG. 2, according to another embodiment.
Figure 5:
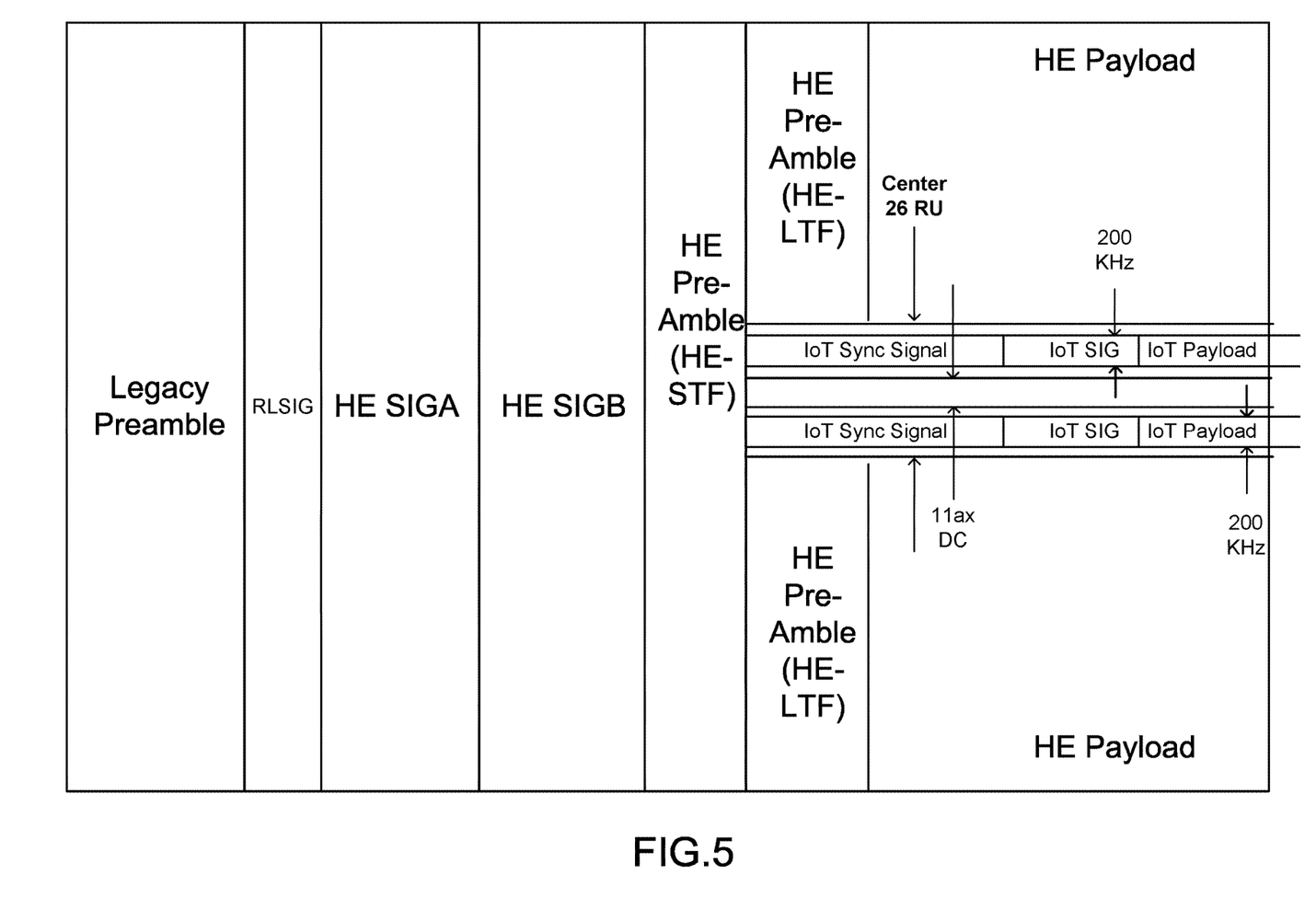
FIG. 5 illustrates another variation of the frame of FIG. 2, according to another embodiment.

Alternative frame formats are shown in FIGS. 4 and 5, according to embodiments. In the embodiment illustrated in FIG. 4, IOT frames are shortened so as to not extend into the bandwidth allocated to the HE preamble (HE-STF and HE-LTF fields). This can be useful in situations where it is desired to avoid potential interference in taking a readjustment of Automatic Gain Control (AGC), which is part of the function of the HE-STF field. FIG. 5 illustrates a frame format which is a hybrid between that of FIG. 2 and FIG. 4. In FIG. 5, the IOT frames extend into the HE-LTF field, but not the HE-STF field, in recognition that the HE-LTF field is not likely to be affected by interference.

An example approach of how to transmit the IEEE 802.11ax PPDU with the IoT frames mixed will now be discussed for embodiments in which the center 26 subcarrier RU is used for IoT frames. A Band-pass Filter (with BW 200 kHz) is applied to each IoT frame surrounding each pre-assigned center frequency. In addition, a Band-stop Filter (with about 2.6 MHz BW) surrounding the center 26 subcarrier RU in the 20 MHz is applied to the IEEE 802.11ax PPDU frame. This allows for the IoT frames to be transmitted with a higher PSD than that of the remaining frame. If the location of IoT frame is different from the center 26 subcarrier RU, then the Band-stop Filter will be applied surrounding the specific RU where the IoT frames are positioned. The Band-pass and Band-stop Filters may be Analog Filters and applied in the RF domain. Alternatively a new waveform such as Filtered OFDM (f-OFDM) can be used to segregate the IoT frames from the IEEE 802.11ax PPDU. Filtered OFDM is discussed in Javad Abdoli, Ming Jia, and Jianglei Ma, "Filtered OFDM: A New Waveform for Future Wireless Systems", IEEE 16$^{th}$ International Workshop on Signal Processing Advances in Wireless Communications (SPAWC), 2015.

It is noted that the embodiment illustrated in FIG. 2 only allocates 200 KHz to the IoT frames to facilitate easier filtering as described above. However, should more accurate filters be utilized, the BW of the IoT frames can be extended to use more of the subcarriers of the center 26 tones. Taking the embodiment discussed with reference to FIG. 2 as an example, there are two IoT frames in the center 26 tone RU, and each IoT frame can utilize 13 tones (subcarriers) of the center 26 subcarrier RU located on either side of the DC Nulls in the IEEE 802.11ax 20 MHz MU PPDU. Once again the IoT frames are not limited to the center 26 subcarrier RU example described, and can extend beyond the 13 subcarriers for frames which provide less bandwidth to other types of STAs.

The contention is done by the IEEE 802.11ax protocol, and the DL IoT frame is only transmitted when the IEEE 802.11ax device accesses the Wi-Fi medium with the IoT frame inserted in the IEEE 802.11ax MU PPDU.

In some embodiments single carrier (SC)-FDMA may be applied to 200 kHz IoT frame to reduce the peak to average power ratio (PAPR), and thus the 64-DFT followed by 256-IFFT may be applied per each IoT frame. That is, at least approximately 800 kHz is reserved for each 200 kHz-width IoT frame, when applying the SC-FDMA, which still fits in the 13 subcarriers of the example described above.

Uplink will now be discussed, according to an embodiment. The IoT devices transmit only their IoT frames ((for example, the frame format of FIG. 1) independent of IEEE 802.11ax PPDU. The AP schedules other devices to be silent while an IoT device is transmitting. Accordingly, the IEEE 802.11ax AP sets the NAV to silence all the IEEE 802.11ax devices from UL transmission, while the IoT devices send the UL transmissions using the IoT frame format of FIG. 1.

Figure 6:
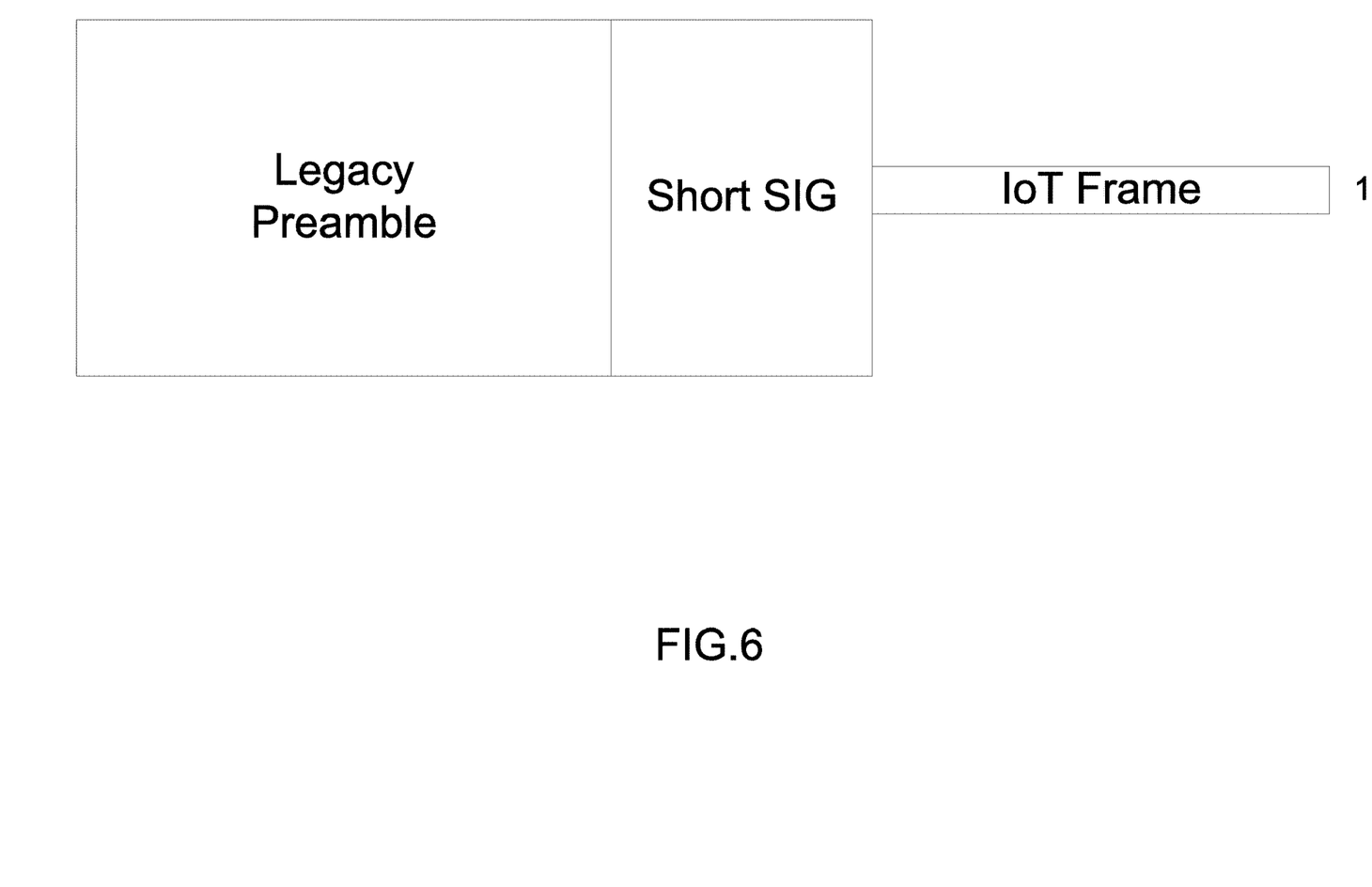
FIG. 6 illustrates another frame format, according to another embodiment.
Figure 7:
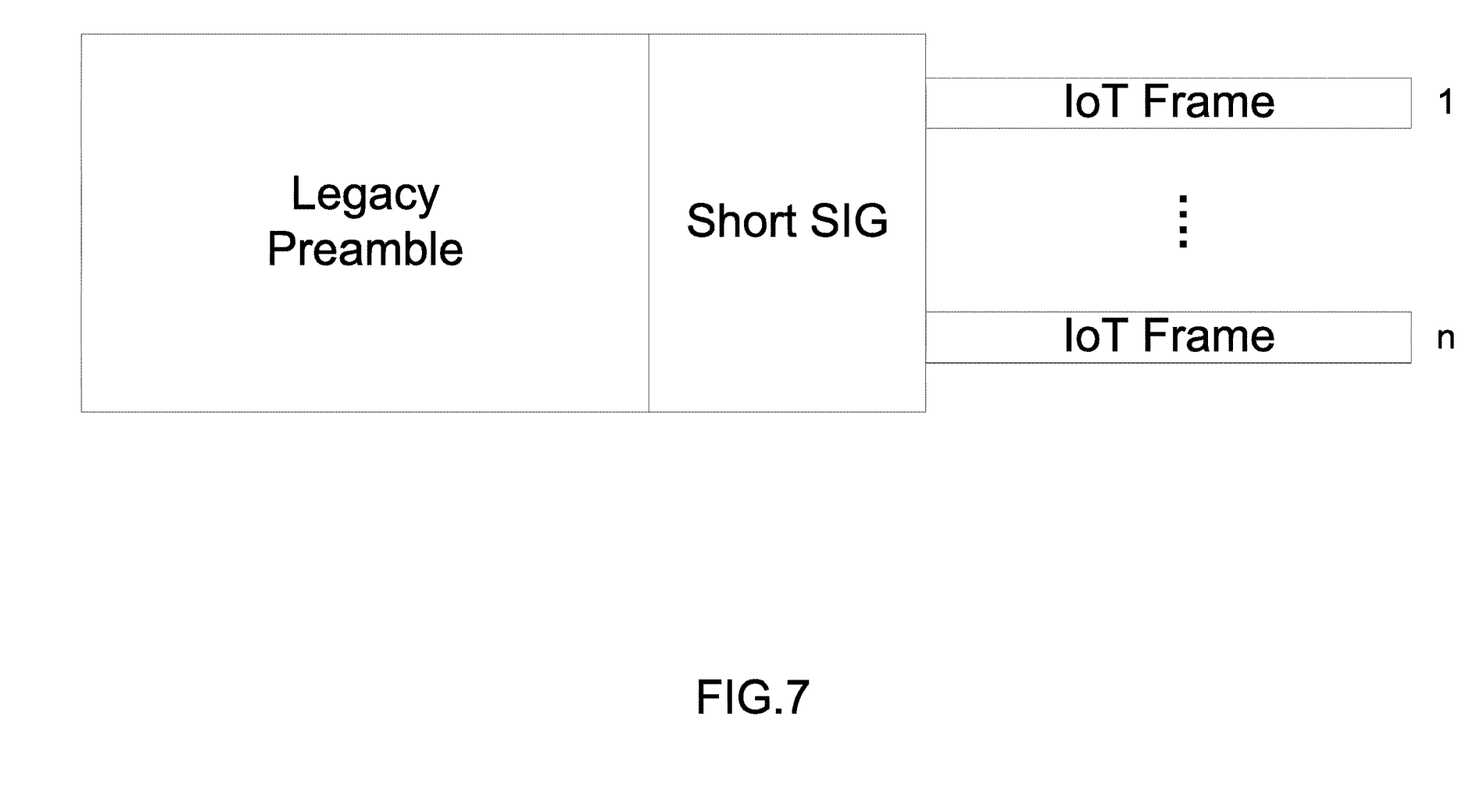
FIG. 7 illustrates another frame format according to another embodiment.

Alternative frame formats are shown in FIGS. 6 and 7 directed to embodiments which provide Distant-Dependent Resource Allocation (DDRA). FIGS. 3 and 4 assume that the AP is aware of the distance between the AP and each STA (e.g., IoT device); and the AP allocates resources accordingly to extend the range such that transmissions can reach the devices. FIG. 6 illustrates a frame format for Narrow Band transmission in the data portion for a far STA from the AP, according to an embodiment. FIG. 7 illustrates a frame format for Narrow Band transmission in the data portion for a plurality of STAs, according to an embodiment.

STAs that are far from the AP will require concentrating the AP transmission power in a narrow subcarrier in order for the AP signal to reach the far STA. For STAs that are not far from the AP, the AP can concentrate its power in more than one narrow subcarrier in order to reach a larger number of STAs.

For example for the AP to reach a STA that is far from the AP, it can concentrate power on one part of the channel as shown in FIG. 6. For the AP to reach two or more STAs that are closer to the AP, then the AP can focus its transmission power in two or more narrow subcarriers as shown in FIG. 7. The width of the subcarriers may take different values depending on the device characteristics. 2 MHz, 5 MHz subcarrier BWs are just two examples. The Short SIG may be different from HE-SIGA and HE SIGB in that it includes AID, RU index, number of NB allocation, and repetition can be applied to the NB. The Short SIG may be repeated like the HE-SIG-A in the HE SU Extended PPDU, but includes the scheduling information of NB allocation. Further, in the frame structure of FIGS. 6 and 7, both repetition (Time or Freq) and power boost can be applied to the Legacy preamble.

Unlike 802.11 STAs which are charged on a regular basis, saving power can be important to some IoT devices. Accordingly, power saving modes, according to some embodiments, will now be discussed. Some embodiments reduce the need for IoT devices to stay in an awake state for a long time. Some embodiments enable an IoT device to wake up at certain times, transmit or receive, or both, and go back to a sleep (low power) state. IoT devices are also expected to have a long duty cycle where they wake up to transmit short frames and go back to sleep. In order to accommodate this behavior, an AP may distribute a schedule to each IoT device upon association based on IoT device requirements (included in the association request). The schedule may also be configured by a network operator. The schedule is mainly static. However the AP may have the freedom to change the schedule during Schedule Change periods advertised to IoT devices.

When it is time to wake up, the IoT device will first sense the media (e.g. using the IEEE 802.11 back-off procedure). If the medium is determined to be idle, the IoT device may transmit its frame(s) to the AP during its service period. If the IoT device doesn't have information to send, then it will solicit frames from the AP by sending a wake-up indication such as the PS-Poll frame. After the frame exchange with the AP, the IoT device will go to sleep again.

If the medium is busy, the IoT device may go to the sleep state and wait for the next scheduled time. It may also stay awake and wait for the medium to become free. The device may wait for a limited period of time after which it will go to the sleep state if the medium continues to be busy.

Figure 8:
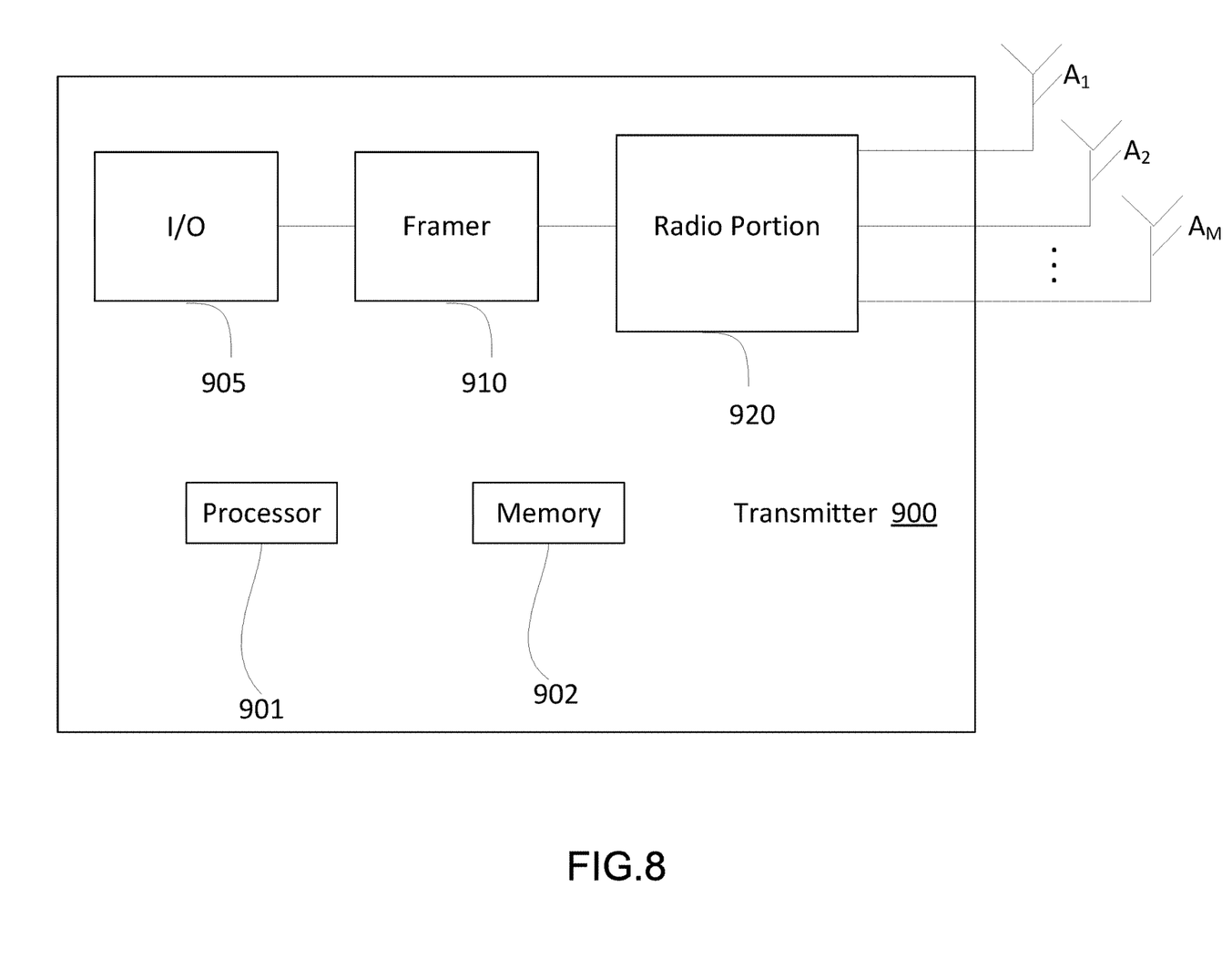
FIG. 8 illustrates a transmitter, which may form part of an access point, according to an embodiment.
Figure 9:
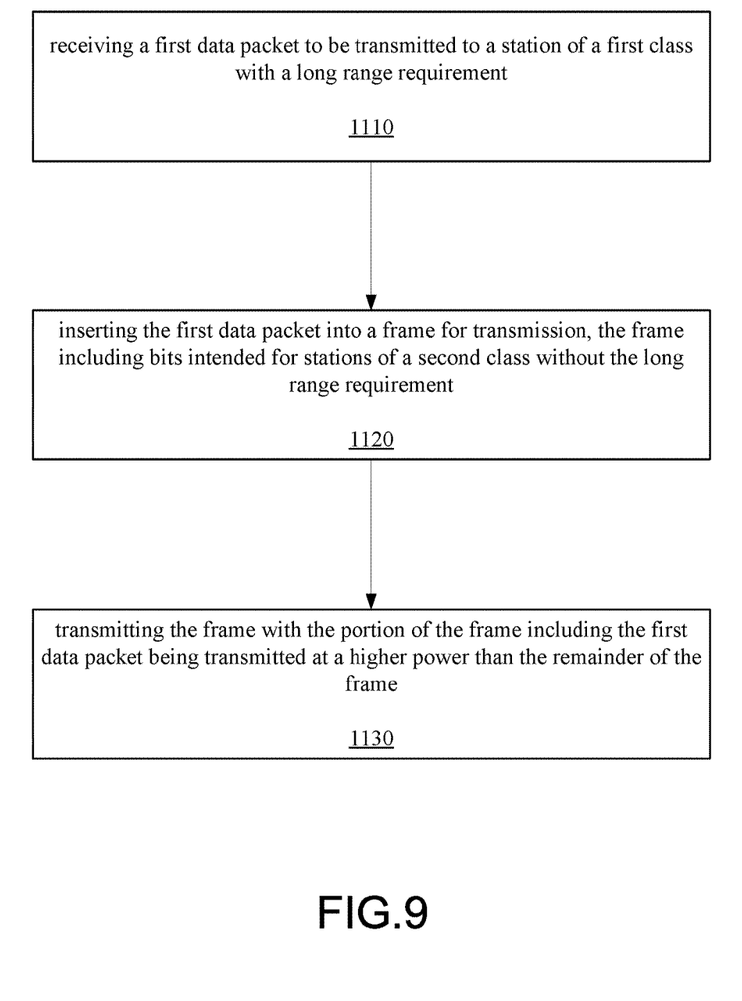
FIG. 9 illustrates a method according to an embodiment.

FIG. 8 is block diagram of a transmitter according to an embodiment. Such a transmitter may form part of an Access Point (AP) or other wireless device. FIG. 9 includes a transmitter 900 coupled to M transmit antennas $A_1, A_2 \ldots A_M$. The transmitter includes a framer 910 for producing frame as discussed herein. For example, the Input/Output (I/O) interface 905 can receive a first data packet to be transmitted to a station of a first class with a long range requirement (e.g., an IoT device). The framer 910 inserts the first data packet into a frame for transmission, for example an IEEE 802.11ax 20 MHz MU PPDU as discussed. The frame including bits intended for stations of a second class without the long range requirement. Such bits can include the legacy preamble bits, and other header information. Further, the I/O framer 905 can receive at least one additional data packet to be transmitted to other stations, and the framer 910 can insert such data into the HE payload portions of the frame.

The transmitter 900 also includes a radio unit 920 for transmitting the frame over M transmit antennas $A_1, A_2 \ldots A_M$. The radio unit 920 can include the filters as discussed above for transmitting the IoT frames with the higher PSD. The framer 910 may be implemented by one or more processors 901 and associated memory 902. The processors may include FPGAs, ASICs, general purpose micro-processors or the like. It should be appreciated that there are other components of the transmitter circuitry which are not germane to the present disclosure, and are therefore not shown.

FIG. 9 is a flowchart illustrating a method for wireless communications by an access point (AP). The method includes receiving a first data packet to be transmitted to a station of a first class with a long range requirement 1110. The method further includes inserting the first data packet into a frame for transmission, the frame including bits intended for stations of a second class without the long range requirement 1120. The method further includes transmitting the frame with the portion of the frame including the first data packet being transmitted at a higher power than the remainder of the frame 1130.

It should be appreciated that the discussion regarding IoT frames is by way of example only, and the techniques discussed herein can be applied to other STAs which require further range and smaller bandwidth than would otherwise be provided by a conventional frame structure.

Embodiments may be implemented in WLAN systems and devices, such as APs, STAs, processor chips, and machine readable mediums for storing machine readable instructions for causing a processor to execute the methods described and claimed herein, and the like.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method for wireless communications by an access point (AP) comprising:
    receiving a first data packet to be transmitted to a station of a first class with a long range requirement;
    inserting the first data packet into a frame for transmission, the frame including bits intended for stations of a second class without the long range requirement; and
    transmitting the frame to at least the station of the first class with a portion of the frame including the first data packet being transmitted at a higher power than a remainder of the frame that includes the bits intended for the stations of the second class without the long range requirement such that the remainder of the frame is ignored by the station of the first class.

2. The method of claim 1 wherein the bits included for the stations of the second class include header bits.

3. The method of claim 2 wherein the header bits include legacy preamble bits, and the AP concentrates power for a payload portion of the frame into a plurality of narrowband subcarriers based on a power required to satisfy the long range requirement.

4. The method of claim 2 further comprising:
    receiving at least one additional data packet to be transmitted to at least one station of the second class without the long range requirement;
    and wherein inserting includes inserting a payload data from the at least one additional data packet into another portion of the frame.

5. The method of claim 4 further comprising:
    receiving a second data packet to be transmitted; and
    inserting the second data packet into the frame for transmission;
    and wherein transmitting comprises transmitting the frame with the portion of the frame including the first data packet and the second data packet being transmitted at a higher power than the remainder of the frame.

6. The method of claim 5 wherein the first data packet and the second data packet are inserted into pre-defined subcarrier portions of the frame.

7. The method of claim 6 wherein the pre-defined subcarrier portions of the frame include the center 26 subcarrier Resource Units (RUs) of the frame.

8. The method of claim 7 wherein the frame includes a null power portion which separates the first data packet and the second data packet.

9. An access point (AP) comprising:
    an input/output interface configured to:
        receive a first data packet to be transmitted to a station of a first class with a long range requirement; and
        receive a second data packet to be transmitted;
    a processor; and
    a memory including machine readable instructions which when executed by the processor cause the AP to:
    insert the first data packet into a frame for transmission, the frame including bits intended for stations of a second class without the long range requirement;
    insert the second data packet into the frame for transmission; and
    transmit the frame to at least the station of the first class with a portion of the frame including the first data packet and the second data packet being transmitted at a higher power than a remainder of the frame that includes the bits intended for the stations of the second class without the long range requirement such that the remainder of the frame is ignored by the station of the first class.

10. The AP of claim 9 wherein the bits included for the stations of the second class include header bits.

11. The AP of claim 10 wherein the header bits include legacy preamble bits, and further comprising instructions executable in the processor to concentrate power for a payload portion of the frame into a plurality of narrowband subcarriers based on a power required to satisfy the long range requirement.

12. The AP of claim 10 further comprising a plurality of filters for filtering frequency components and a combiner for producing a signal with the frame having the portion of the frame including the first data packet being transmitted at a higher power than the remainder of the frame.

13. The AP of claim 10 wherein:
    the input/output interface receives at least one additional data packet to be transmitted to at least one station of the second class without the long range requirement;
    and further comprising instructions executable in the processor to:
        include payload data from the at least one additional data packet into the frame; and
        transmit the frame with a portion of the frame including the at least one additional data packet being transmitted at a lower power than the portion of the frame including the first data packet.

14. The AP of claim 9 further comprising instructions executable in the processor to insert the first data packet and the second data packet into pre-defined subcarrier portions of the frame.

15. The AP of claim 14 wherein the pre-defined subcarrier portions of the frame include the center 26 Resource Units (RUs) of the frame.

16. The AP of claim 15 further comprising instructions executable in the processor to include a null power portion which separates the first data packet and the second data packet.

* * * * *

UNITED STATES PATENT AND TRADEMARK OFFICE
CERTIFICATE OF CORRECTION

Page 1 of 1

PATENT NO. : 10,945,219 B2
APPLICATION NO. : 15/358293
DATED : March 9, 2021
INVENTOR(S) : Jung Hoon Suh, Osama Aboul-Magd and Kwok Shum Au It is certified that error appears in the above-identified patent and that said Letters Patent is hereby corrected as shown below:

In the Specification

Column 1, Line 11, "Classes" filed Apr. 4, 2016, which is hereby incorporated by" should read --Classes" filed Apr. 15, 2016, which is hereby incorporated by--

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*